United States Patent Office 2,779,708
Patented Jan. 29, 1957

2,779,708
DEXTRAN DENTIFRICE PREPARATIONS

Kenneth Lyman Russell, Nutley, and Manno Fredrick Nelson, Jr., Madison, N. J., assignors to Colgate-Palmolive Company, a corporation of Delaware No Drawing. Application February 18, 1953,
Serial No. 337,685

4 Claims. (Cl. 167—93)

The present invention relates to a dentifrice preparation comprising a polishing material, an organic detergent and a minor amount of dextran as an added cleansing agent. This combination has been found to possess marked cleansing power as hereinafter described.

In general, dextran is a non-toxic high molecular weight polymer which is at least partially soluble in water. It is a gum which swells usually in an aqueous medium and may be dissolved or dispersed with the formation of cloudy suspensions. Structurally, it is a polysaccharide, being a high polymer of glucose units joined together through 1:6 glucoside links predominantly. This main chain has short branches at various intervals which are believed joined through 1:4 glucoside links or branching points. The specific or exact manner or degree of polymerization is not believed critical provided some water solubility (including dispersibility) is maintained since the product usually comprises a mixture of specific polymers each containing a different number of units, depending upon the manner and degree of polymerization, depolymerization, fractionation, if any, etc. The cleansing efficacy of the product, moreover, is an observable phenomenon and readily determinable by simple procedures in view of the present invention, as illustrated by the stain-removal test described herein.

These materials are bacterial dextrans and produced in known manner due to fermentation of a suitable polysaccharide by bacteria (including enzymes derived therefrom). In general, they are synthesized commercially by direct bacterial action on a nutrient polysaccharide medium consisting largely of sucrose by the genus *Leuconostoc mesenteroides* or the like. A general procedure for the commercial manufacture of both raw or native dextran and depolymerized dextran is set forth in Manufacturing Chemist, February 1952, pages 49–54. The dextran may be produced by other suitable means such as by enzymatic synthesis of sugars to dextran by enzyme preparations derived from *L. mesenteroides* or the like, as set forth in Journal of Bacteriology, vol. 63 (1952), pages 293–5 for example. It has been prepared also from certain dextrins by the action of bacterial cultures and enzymes as illustrated in Journal of Biological Chemistry, vol. 192 (1951), pages 161–174.

The raw dextran as formed directly from the fermentation, hereinafter called native dextran, is of high molecular weight, usually of the order of at least about one million. It is preferred to use native dextran, particularly those products having an approximate molecular weight of about three million to about ten million, though products of higher and lower molecular weight may be employed in the present invention also. Two suitable commercial native dextran products obtainable in the form of white granular solids are characterized by the following properties:

|  | Native Dextran I | Native Dextran II |
|---|---|---|
| Average molecular weight (after removal of free sugar and ash) | 6 million | 8–10 million |
| Composition: |  |  |
| Dextran | 75% | 98%. |
| Ash | 4% | Very little. |
| Volatiles | 4% |  |
| Fructose polymer | 17% | Very little. |
| Viscosity, centipoises, at 25° C. (Brookfield): |  |  |
| 2% solution | 10–15 | 10–15. |
| 4% |  | 900–2,400. |
| 5% | 250 |  |

Such native dextran products exhibit superior stain-removal action in the present compositions in comparison to products of much smaller molecular weight, such as depolymerized dextran. The partially depolymerized or degraded dextran is effective in the present invention, however, such products having approximate molecular weights of about 10,000 to one million and usually the order of about 25,000 to 75,000.

The dextran material exerts its beneficial functions in a dentifrice in widely variable proportions relative to the balance of the dentifrice composition. In the formulation of commercially acceptable dentifrices containing dextran due consideration must be given to the type of composition, e. g., dental cream, or powder; to the specific effects desired, and to the molecular weight of the polymer. In dental creams and powders it will usually be sufficient to use suitable amounts up to about 10%, and preferably up to about 5%, e. g., 0.1–3%. The polymer may be added in any suitable form during manufacture dependent upon the type of dentifrice composition. For example, such polymers may be utilized as an aqueous solution (including suspension, dispersion, etc.) or in powder form.

Any suitable practically water-insoluble polishing agent may be employed in the dentifrice preparations of the present invention. There is a relatively large number of such materials known in the art. Representative materials include, for example, calcium carbonate, dicalcium phosphate (anhydrous or hydrated), tricalcium phosphate, insoluble sodium metaphosphate, aluminum hydroxide, magnesium carbonate, calcium sulfate, etc., including suitable mixtures thereof. It is preferred to use the practically insoluble calcium and/or magnesium salts as polishing agents, and more particularly, calcium carbonate and/or a calcium phosphate (e. g., dicalcium phosphate) in view of the excellent results obtained by their use. In general, these polishing agents will comprise a major proportion by weight of the solid ingredients. The amount utilized is variable and dependent somewhat upon the specific abrasive effects desired and the formulation, but will generally be up to 95% by weight of the total composition. In the case of a dental cream, the content of such polishing agents will generally be about 20–75%, usually about 30–65% and preferably about 40–60% by weight of the dental cream whereas in tooth powders the polishing agents will usually be in major proportion, such as about 70–95% by weight. Included within the scope of the invention are the dental powders, pastes, tablets, etc., which are designed for vigorous cleansing of the teeth by dentists. Such products may possess varying amounts of such water-insoluble agents as kieselguhr, pumice, bentonite, etc.

The use of such polishing agents in combination with the dextran is highly beneficial in practice. Such mild abrasives supplement the stain removing properties, particularly with reference to such stains as food colors, mucin, etc. Furthermore, the mechanical rubbing action of the polishing agents is minimized or modified in a desirable manner by the action of the dextran during use of the dentifrice containing such mixtures. As an ultimate result the teeth are also polished resulting in a further protective action against staining. The use in those compositions of a water-insoluble calcium phosphate, preferably dibasic calcium phosphate dihydrate, in part or whole as polishing agent is particularly desirable because of the fineness of its particles and its relative freedom from abrasiveness and scratching.

There is included a water-soluble detergent compound in these compositions, such surface active agents being usually characterized by having a long aliphatic chain in the molecule and a water-solubilizing group. Suitable detergents may be anionic, non-ionic or cationic in structure. Such detersive agents are known and include, for example, the water-soluble salts of higher fatty acid monoglyceride mono sulfate detergent (e. g., sodium salts of monosulfated monoglycerides of mixed higher fatty acids derived from coconut oil,) higher alkyl sulfate detergent (e. g., sodium lauryl sulfate,) alkyl aryl sulfonate detergent (e. g., sodium dodecyl benzene sulfonate,) higher alkyl sulfoacetate (e. g. sodium lauryl sulfoacetate,) higher fatty acid amides of amino carboxylic acid (e. g., sodium N-lauroyl sarcosine,) the conventional soaps of animal or vegetable fatty materials which are water-soluble salts of higher fatty acids (e. g., sodium soaps of mixed fatty acids of coconut oil,) etc. These materials also aid in the removal of foreign matter from the teeth by detersive and emulsifying action, etc., and produce a desirable foaming action in the dentifrice compositions. The foaming action and general solubility effects of the detergent aid in the ready penetration of the various ingredients including the dextran into the more inaccessible tooth surfaces and thereby further promote the effectiveness of the dentifrice composition. In general, these detersive agents may be used in any suitable amount, such as up to about 20% by weight, dependent upon the type of preparation. In the case of dental creams and tooth powders, the detergents will generally be from about 0.5 up to about 10% by weight. The non-soap or synthetic detergents in creams or powders will usually be employed in an amount up to about 5% by weight.

It is preferred to employ the water-soluble non-soap or synthetic detergents, with optimum effects resulting with the anionic non-soap organic detergents, such as the sulfates, sulfonates and fatty acid amides of amino acids as detergents. In general, these materials in a dental cream have high foaming activity and are more compatible with the inorganic calcium- or magnesium-containing polishing agents, particularly dicalcium phosphate dihydrate, in comparison to soaps, particularly in a dental cream.

An embodiment of the present invention relates to a dental cream. The various solid and liquid ingredients are proportioned in known manner to form a substantially uniform and homogeneous creamy mass which can be extruded from a collapsible tube, such as an aluminum or lead tube. The water-insoluble polishing agents are substantially in suspension, the final cream usually being set to a gel or the like. The dextran material should be suitably dissolved or dispersed in the liquid content of the cream for optimum effects. In this manner, the polymers are already in solution and available for effective action immediately. The dental cream moreover usually forms a slurry or sludge in the oral cavity which prevents prompt dissipation of the polymer. In general, the liquid in the cream will comprise chiefly such materials as water, glycerine, sorbitol, propylene glycol, etc., including suitable mixtures thereof. It is usually advantageous to use a mixture of both water and a humectant or binder such as glycerine, sorbitol, etc. The total liquid content will generally be from about 20 to about 75% and usually about 30–65% by weight of the formulation. In aqueous-humectant mixtures referred to above, the water and the humectant will usually be from about 5–50% each, and preferably 10–40% each of the total ingredients which are proportioned to form a dental cream of desired consistency.

Other adjuvant materials may be similarly incorporated in suitable amounts. The dextran material may function as the gum in the dental cream but if desired an additional gelling agent may be employed such as various natural and synthetic gums and gum-like materials, e. g., Irish moss, gum tragacanth, sodium carboxymethylcellulose, starch, etc., usually in an amount up to 10% by weight of the dental cream, and preferably from 0.5–5%. Furthermore, such materials as soluble saccharin, flavoring oils, (e. g., oils of spearmint, peppermint,) coloring or whitening agents, preservatives, alcohol, etc., may be used as desired in proper amount.

Another embodiment of the present invention relates to a dental or tooth powder. Such products may be prepared by mechanical admixture of the various ingredients, such as a major proportion of polishing agent, and a minor proportion or amount of the dextran material with optional amount of water-soluble foaming detergent, flavor ingredients, etc. The amount of moisture should be usually at a minimum in order to maintain an essentially free-flowing product in relatively fine particle form. With the use of such products in the usual manner, the dextran will be suitably dissolved or dispersed in the aqueous slurry formed in the mouth and will exert its cleansing power in combination with the other ingredients such as the polishing agent and foaming detergent.

The pH of the final formulations of the present invention is variable and, therefore, the products may have any suitable pH value in solution. Where reference is made to pH values it may be determined in the case of a dental cream or powder on a 20% aqueous slurry of said cream or powder. Thus, it is generally desired that the pH of the product under the testing conditions indicated be from about 5 up to about 10, and preferably from about 5.5 to 9, with optimum desired effects at a substantially neutral pH value in solution, e. g., about 6 to 8.

The following specific examples are further illustrative of the nature of the present invention, but it is to be understood that the invention is not limited thereto. All amounts of the various ingredients are by weight unless otherwise specified.

Example I.—Dental cream

| Ingredient | Percent |
| --- | --- |
| Dicalcium phosphate | 46.2 |
| Native dextran | 1.0 |
| Detergent | 3.75 |
| Glycerine | 30.5 |
| Irish moss | 0.95 |
| Soluble saccharin | 0.15 |
| Sodium benzoate | 0.5 |
| Flavor | 1.2 |
| Water | Q. S. |

The dental cream is prepared as follows: The saccharin, the sodium benzoate preservative and water are added to a suspension of the Irish moss gum in glycerine and the mix is stirred and heated to 165° F. to form a gel-like mass. The detergent (e. g., sodium salt of monosulfated monoglycerides of mixed fatty acids derived from coconut oil) is then added to the hot mix with stirring, followed by the polishing agent. The mixture is then cooled and the native dextran (M. W. 3 to 10 million) and flavor are added with stirring. The finished mix is then milled and deaerated if desired to produce a smooth homogeneous cream paste which is packaged subsequently in collapsible aluminum or lead tubes.

Evaluation tests show that this dental cream has markedly better cleansing action than corresponding dental creams which do not contain the dextran. Such cleansing effects may be illustrated by the following test. Porous porcelain strips (¾" x 4" x ¼") are swabbed with an aqueous-alcohol solution of tobacco juice to produce a uniform film-like stain. These strips are maintained temporarily in water which fixes the tobacco stains. Each strip is thereafter subjected to 15,000 standardized strokes of a toothbrush mounted in a suitable toothbrushing apparatus. The toothbrush is treated initially with an aqueous slurry of the dental cream or other dentifrice to be tested before each series of tests. After washing and drying the various samples, the whiteness reflectance of each strip is measured by a spectrophotometer. The results obtained using the dental cream of Example I in contrast to an otherwise equivalent dental cream free of dextran are set forth in the table below. The numerical values in the table are reported in terms of percent reflectance, using the reflectance value of an unstained poreclain strip as a standard of 100%.

TABLE

| Porcelain Strip | Percent Reflectance | Color |
| --- | --- | --- |
| (a) Unstained | 100.0 | Grayish white. |
| (b) Stained | 68.1 | Brown to black. |
| (c) Brushed with control dental cream | 78.1 | Light brown. |
| (d) Brushed with cream containing dextran | 99.8 | Grayish white. |

The stain-removing efficacy of the dental cream of the present invention is self-evident from the data. It may be noted also that the porcelain enamel strip treated with such dental cream was equivalent in whiteness and light reflectance to the originally unstained porcelain.

*Example II*

A dental cream is prepared according to the formulation in Example I with the modification that 2% degraded dextran is substituted for the 1% native dextran. This dental cream exhibits markedly improved stain-removal properties in comparison to a similar cream which does not contain dextran, but is not quite as effective as the formulation of Example I containing 1% native dextran.

Other suitable formulations productive of desired results and which may be prepared in the usual manner are:

*Example III.—Dental cream*

| | Percent |
| --- | --- |
| Dicalcium phosphate dihydrate | 50.0 |
| Native dextran | 1.0 |
| Sodium N-lauroyl sarcoside | 2.0 |
| Glycerine | 28.0 |
| Viscarin gum | 0.8 |
| Soluble saccharin | 0.15 |
| Sodium benzoate | 0.5 |
| Tetrasodium pyrophosphate | 1.0 |
| Trimagnesium phosphate | 0.75 |
| Flavor | 1.2 |
| Water | Q. S. |

*Example IV.—Tooth powder*

| | Percent |
| --- | --- |
| Dicalcium phosphate dihydrate | 70.0 |
| Calcium carbonate | 20.8 |
| Sodium coconut monoglyceride monosulfate | 4.0 |
| Native dextran | 3.0 |
| Soluble saccharin | 0.2 |
| Flavor | 2.0 |

Although the present invention has been described with reference to particular embodiments and examples, it will be apparent to those skilled in the art that variations and modifications of this invention can be made and that equivalents can be substituted therefor without departing from the principles and true spirit of the invention.

Having thus described the invention, what is claimed is:

1. A dentifrice composition comprising at least about 20% by weight of water-insoluble polishing material, an organic detergent, and dextran in an amount from about 0.1 to 10% by weight as an added cleansing agent.

2. A dentifrice composition in accordance with claim 1 which contains native dextran.

3. A dentifrice composition in accordance with claim 1 which contains depolymerized dextran having a molecular weight of at least 10,000.

4. A dental cream comprising a liquid vehicle, at least about 20% by weight of a water-insoluble phosphate polishing material suspended therein, an anionic organic synthetic detergent, and from about 0.1 to 3% by weight of dextran in said liquid vehicle.

References Cited in the file of this patent

UNITED STATES PATENTS 2,437,519   Gronwall _____ Mar. 9, 1948

OTHER REFERENCES

Thomssen: Drug and Cosmetic Industry (vol. 55, No. 5) Nov. 1944, pages 537, 618, 619 and 620.

Sugar, Aug. 1948, pages 28 and 29, "The Production of Gum Dextran."